July 31, 1928.                                                    1,678,777
F. D. HANSEN ET AL
BRAKE DRUM AND LINER
Filed Sept. 15, 1927
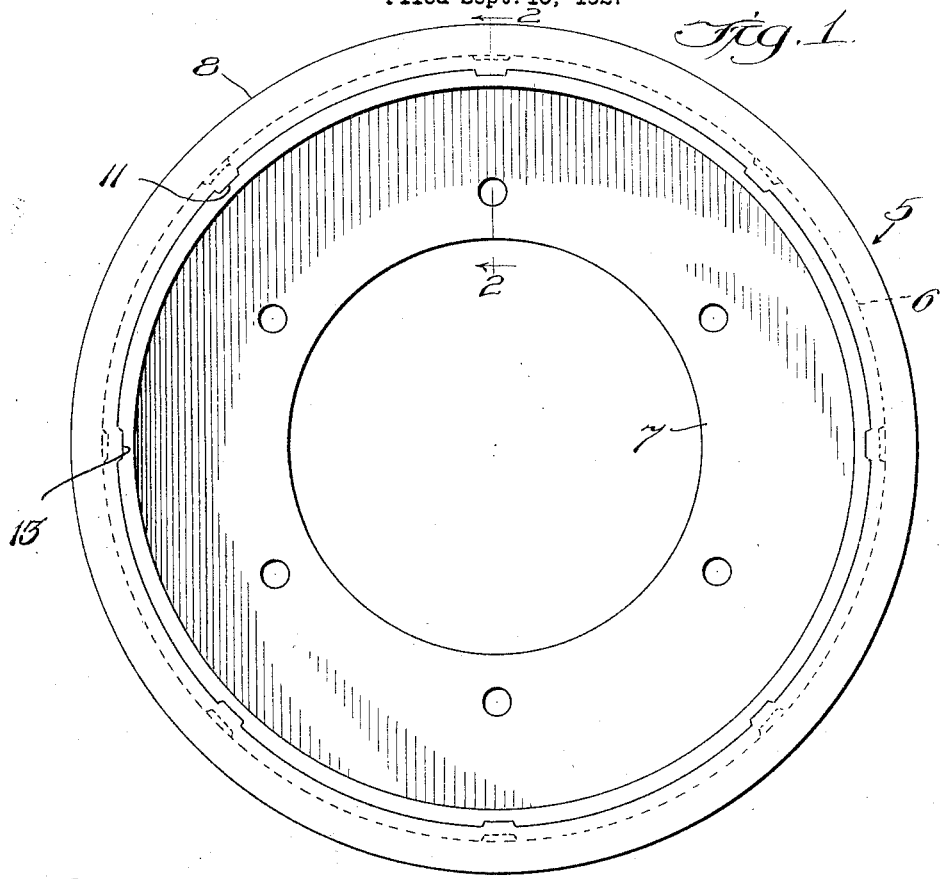
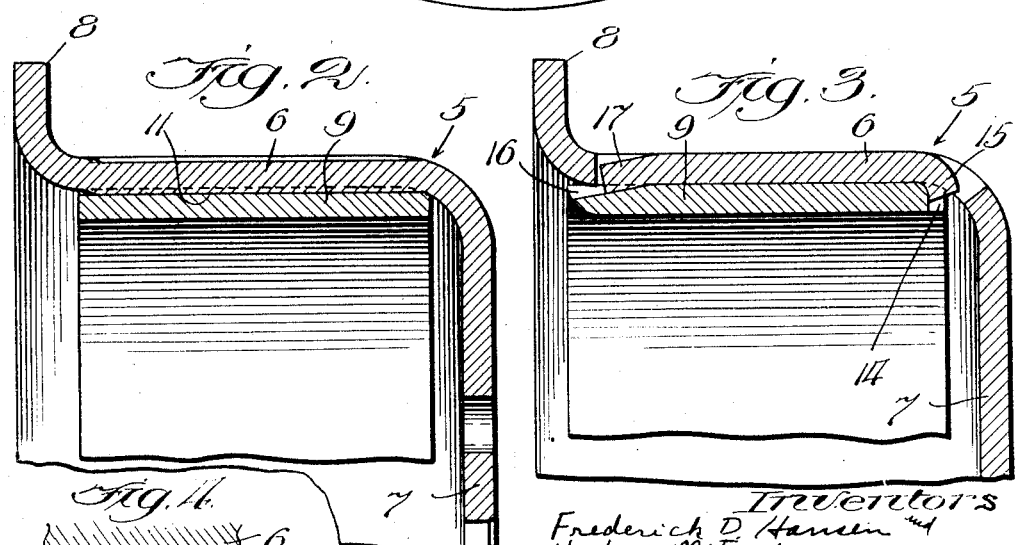
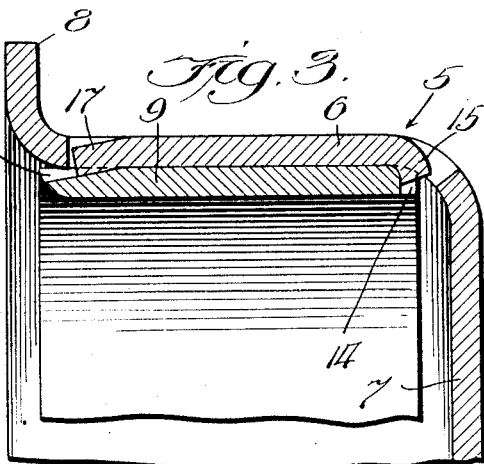
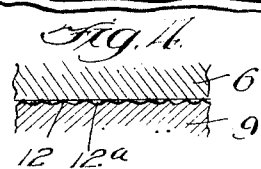
Inventors
Frederich D. Hansen and
Herbert W. Tinker
by Rector, Hibben, Davis and Macauley
Attys Patented July 31, 1928.

1,678,777

UNITED STATES PATENT OFFICE.

FREDERICK D. HANSEN AND HERBERT W. TINKER, OF MILWAUKEE, WISCONSIN, ASSIGNORS TO FEDERAL PRESSED STEEL COMPANY, OF MILWAUKEE, WISCONSIN, A CORPORATION OF WISCONSIN.

BRAKE DRUM AND LINER.

Application filed September 15, 1927. Serial No. 219,635.

This invention relates to brake drums and more especially, though not necessarily, to those used on automotive vehicles and the like.

The primary object of the invention is to provide a novel combination comprising a brake drum and liner therefor, characterized by the liner having a smaller co-efficient of expansion than the drum but greater wearing properties and by the liner being partially insulated from the brake drum, so that the liner and brake drum flange expand and contract together to the same small degree, whereby the liner does not become loose in the brake drum or does not exert too great a pressure on the brake drum when expanded due to the heat. To this end, we preferably employ a low-carbon pressed-steel brake drum and an alloy-steel or high-carbon steel liner and preferably rough machine the outer periphery of the liner so that there are air spaces between the liner and the flange of the drum when the two are assembled. It will be evident that the rough machining causes a number of projecting points on the liner which engage or bite into the flange of the drum, the depressions or pockets between the projections forming the small air pockets or air spaces. The liner has a small coefficient of expansion so that when it is heated through friction with the brake shoes or band it expands but little and consequently contracts but little when it cools. The low carbon brake drum has a relatively high coefficient of expansion but as little heat is transmitted to it, due to the insulating effect of the air pockets, it is only slightly heated and thus expands and contracts but little and in unison with the liner so that a tight fit is always assured and the liner cannot come loose or "crawl" or work out of the drum.

Another object of our invention is to provide improved means for rigidly securing the liner within the brake drum.

The foregoing and other objects and advantages of the invention will appear more fully in the following detailed description, taken in conjunction with the accompanying drawings.

Of said drawings, Figure 1 is an inside elevation of a brake drum embodying our invention;

Fig. 2 is a detail section taken through the drum as on the line 2—2 of Fig. 1;

Fig. 3 is a similar cross sectional view illustrating means for positively retaining the liner within the drum and also for preventing it from rotating relatively to the drum; and Fig. 4 is an enlarged detail section through parts of the liner and brake drum flange and shows the rough outer surface of the liner in an exaggerated fashion.

Referring to the drawings, the brake drum 5 has the usual circular flange 6 and the web or bottom 7 by which the drum is secured to the vehicle wheel. The flange at its outer end is provided with an outwardly turned flange portion 8 in order to give the drum additional strength, and while this flange portion is not essential, yet we desire to use it on brake drums for trucks in particular, where the drums are subjected to harder use than on passenger cars. We have perfectly formed the drum by pressing it into shape from a sheet of low-carbon steel which has a comparatively high coefficient of expansion. The liner 9 is in the shape of a continuous ring which is preferably formed of alloy cast steel, though it be formed of a strip of alloy steel rolled to circular form and welded together at its ends. The liner, if desired, may also be formed of high-carbon cast steel. The exterior of the liner is given the rough machining operation while the inside surface is given a smooth machine finish, being the surface against which the friction material on the brake shoes engage. As the outside of the liner is given a rough machining operation, it will be readily seen that a very large number of minute projections 12 with interposed depressions are formed on the outer surface, as illustrated on a greatly exaggerated scale in Fig. 4.

The liner may be forced in the drum by means of a press or other suitable machine. When assembled projections 12 on the outer periphery of the liner are in firm engagement with the flange of the drum and shallow air pockets or spaces 12ª are provided between the liner and flange so that the liner is partly insulated from the drum. In order to positively prevent the liner from rotating relative to the drum we provide transverse grooves 13 in the outer periphery of the liner in which engage press-in ribs 11 in the flange 6.

When the liner becomes worn and it is desirable to replace it by a new one, the liner may be pulled out of the drum by any suitable tool and a new one inserted.

In Fig. 3 we have shown modified novel means for preventing relative rotation movement between the liner and the drum and also positive means for preventing the liner from crawling or working axially out of the drum and these means will now be described.

The inner edge of the liner is provided with a suitable number of equally spaced recesses 14 and the drum is provided with a corresponding number of protrusions or tongues 15 which are pressed inwardly into engagement with the recesses 14. The forward edge of the liner is provided with a number of recesses 16 and when the liner is in place protrusions or tongues 17, cut in the flange of the brake drum, are pressed into place so that they engage the inclined bottoms of the recesses 16 and thus prevent axial movement of the liner with respect to the drum.

It will now be evident from the foregoing description that the drum and liner are well adapted to accomplish the objects primarily stated. The coefficient of expansion of the liner 9 is quite low and preferably smaller than the coefficient of expansion of the brake drum. The liner is heated to a much greater extent than the brake drum, due largely to the insulating air spaces between the two, and their coefficients of expansions are so proportioned that they expand, when heated, and contract, upon cooling off, substantially to the same extent, thus always affording a tight fit between the two, so the brake lining never becomes loose in the drum.

We have found that the pressed steel brake drum can be made much lighter in weight than the ordinary pressed steel brake drum without the liner, and the combined weight of the brake drum and liner is about the same as the weight of a pressed steel brake drum without the liner to be used under the same conditions. Our brake drum and liner are also much cheaper, as well as much better than the ordinary high-carbon cast drum or the high-carbon forged or hot-pressed brake drum, and, of course, wears much better than the ordinary low-carbon pressed steel brake drum. It is only necessary to rough machine the outside surface and finish machine the inside surface of our liner, so that the machining operations are cheaper than those which must be performed on a cast drum.

The means, shown in Fig. 3, for preventing rotation and axial movement of the liner with respect to the brake drum are preferably employed, although they are not necessarily essential on drums used on all vehicles. The means shown, however, are of some importance as they are cheap and efficacious.

We claim:

1. A brake drum provided with a flange having a high coefficient of expansion and a liner having a relatively low coefficient of expansion and partially insulated from said flange so that the liner and flange expand and contact together substantially the same extents.

2. A brake drum provided with a flange having a high coefficient of expansion and a liner having a relatively low coefficient of expansion and partially insulated from said flange by air so that the liner and flange expand and contact together substantially the same extents.

3. A brake drum provided with a flange having a high coefficient of expansion and a liner having a relatively low coefficient of expansion, the contacting surface of one of them having projections engaging the surface of the other and affording air spaces between the surfaces to partially insulate the flange from the liner.

4. A brake drum provided with a flange, and a brake liner having its outer surface rough machined to provide numerous projections engaging the interior of the flange and providing shallow air spaces between the flange and liner to partially insulate the liner from the flange.

5. A brake drum provided with a flange having a high coefficient of expansion and a tightly fitting brake liner having a relatively low coefficient of expansion and comprising a continuous ring rough machined on one surface to provide a multitude of projections engaging the contacting surface of the flange and afford shallow spaces between the liner and flange.

6. A brake drum formed of pressed steel having a high coefficient of expansion, and a continuous unbroken liner formed of steel having a relatively low coefficient of expansion and having one surface rough machined and engaging a correspondingly shaped surface on the drum.

7. A flanged brake drum pressed from a sheet of low carbon steel and a high carbon steel liner pressed into the flange of drum so that its outer surface engages the inner surface of the flange, one of said surfaces being relatively rough to provide air spaces between the surfaces.

8. A brake drum having a flange provided with spaced protrusions formed by cutting through the metal of the drum, and a liner fitting in the flange and having correspondingly spaced recesses into which the protrusions are adapted to be pressed to prevent movement of the liner relative to the flange.

9. A brake drum having a flange provided with spaced protrusions formed by cutting through the metal of the drum, and a liner fitting in the flange and having correspondingly spaced tapered recesses in its outer periphery, the tongues being bent into the recesses.

10. A pressed steel brake drum provided with a flange having a high coefficient of expansion and a steel liner fitted tightly within the flange and having a substantially uniform distribution of carbon content and a low coefficient of expansion so that the tight fit within the flange is maintained under all conditions without liability of rupture of the liner.

11. A brake drum provided with a flange and a continuous unbroken liner pressed into tight relationship with the flange and formed of steel having a substantially uniform texture and a low coefficient of expansion so that under the various conditions of use the tight relationship is maintained substantially constant without liability of rupture of the liner.

12. A brake drum provided with a flange and a liner having a low coefficient of expansion and fitted tightly to said flange, the fitted surface of the liner being rough and the opposite braking surface smooth.

13. A brake drum provided with a flange and a continuous liner having a low coefficient of expansion and partially insulated from said flange by air so that the liner and flange expand and contract together substantially to the same extent.

In witness whereof, we have subscribed our names.

FREDERICK D. HANSEN.
HERBERT W. TINKER.